June 12, 1962 P. E. GUMMESON ETAL 3,038,711
CONTINUOUS KILNS
Filed Dec. 12, 1958 6 Sheets-Sheet 1
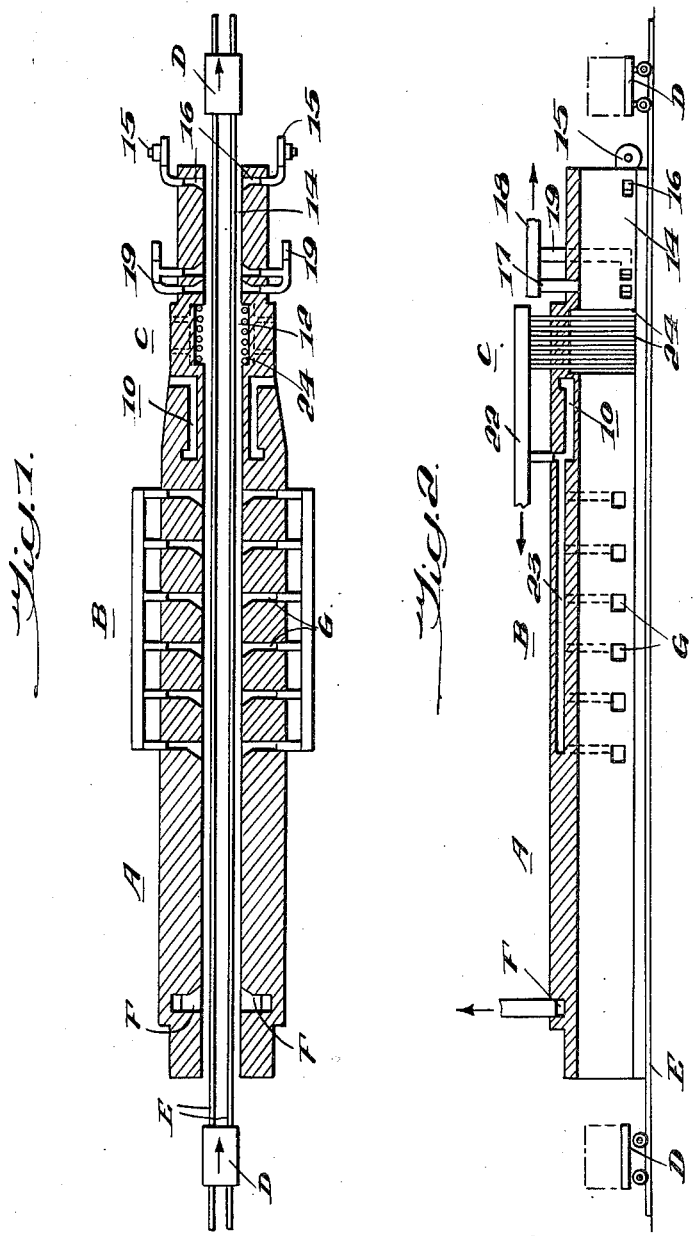
INVENTORS
Per Eg Gummeson
Mihkel Mathiesen
BY Pierce, Scheffler & Parker
ATTORNEYS

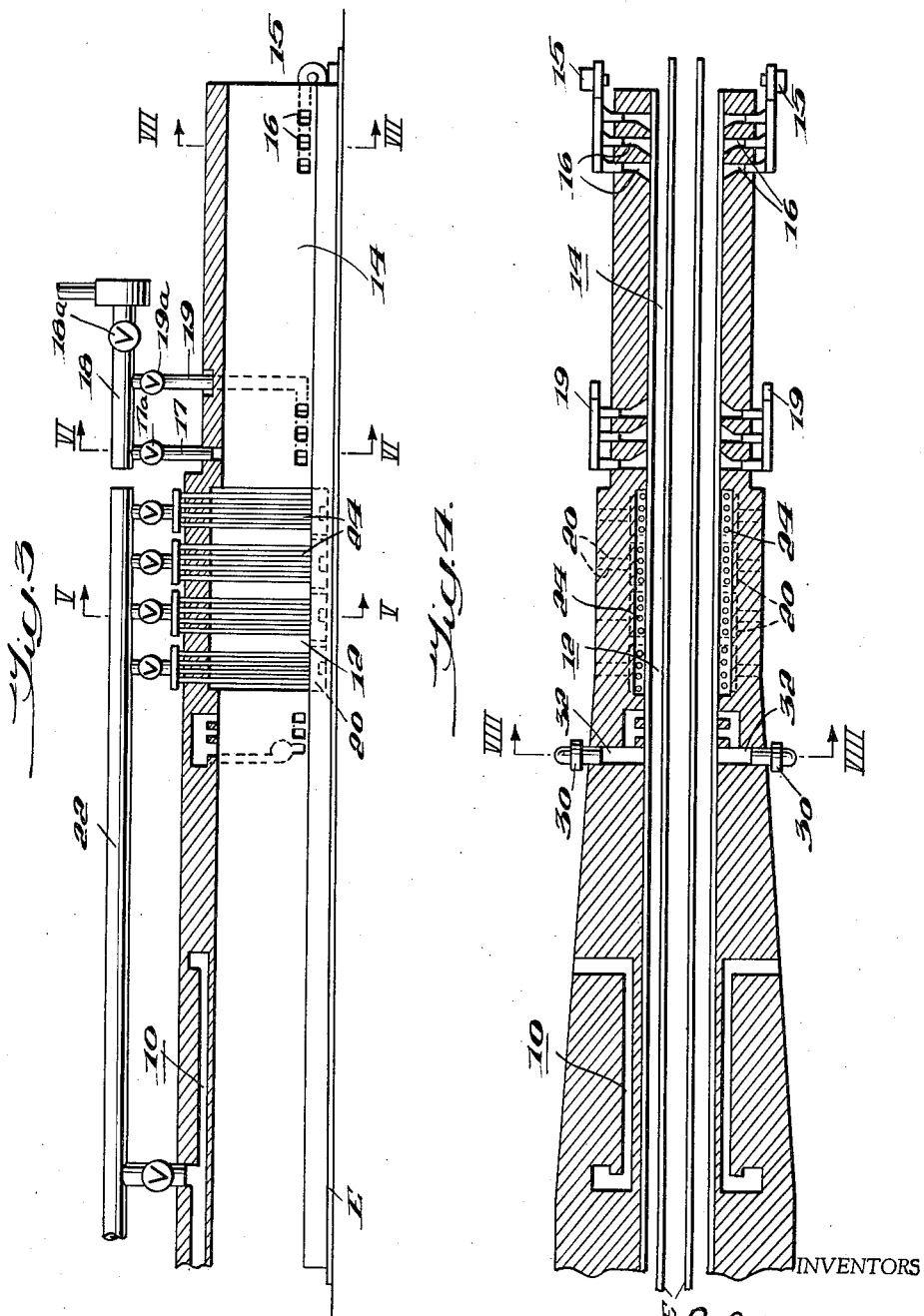

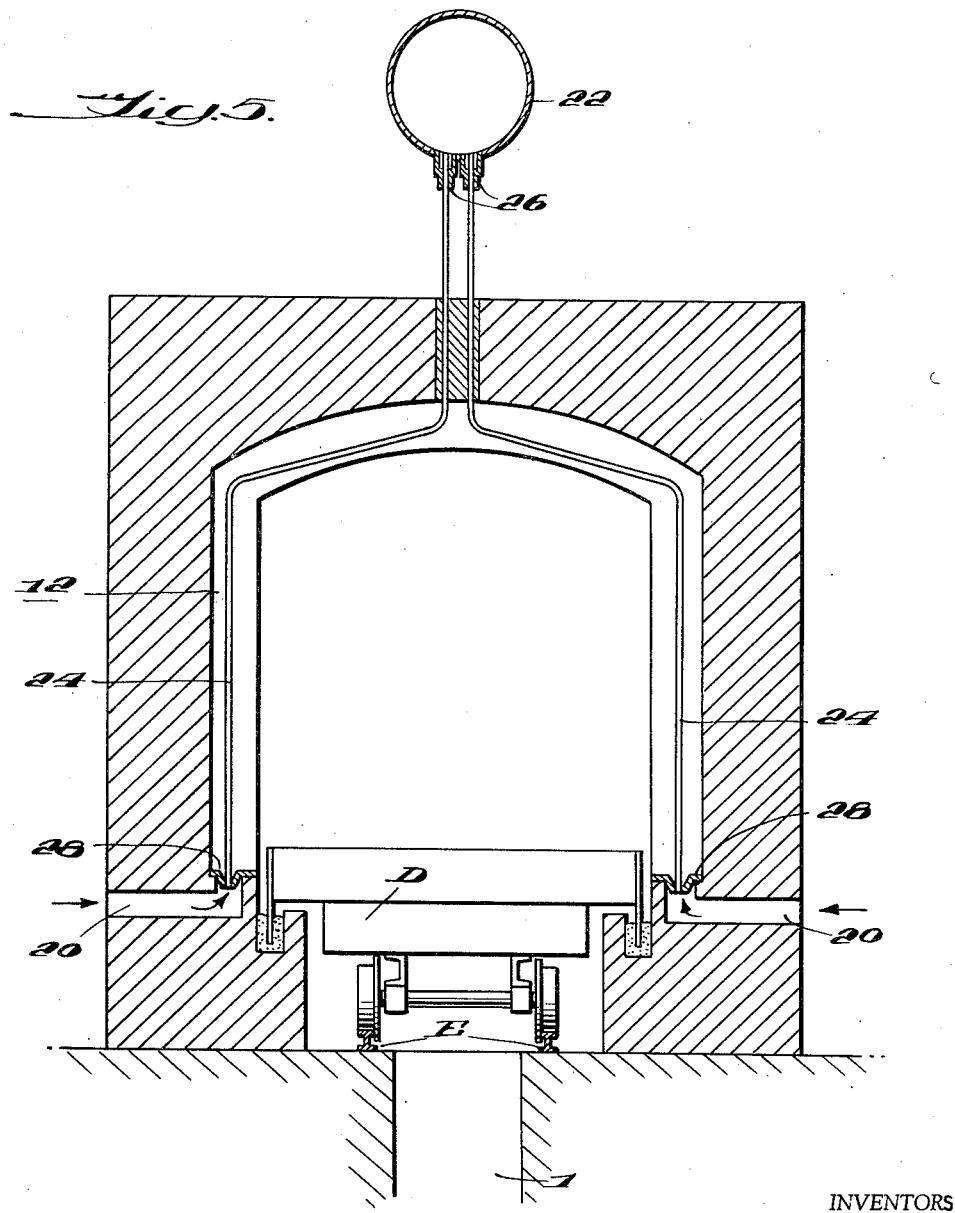

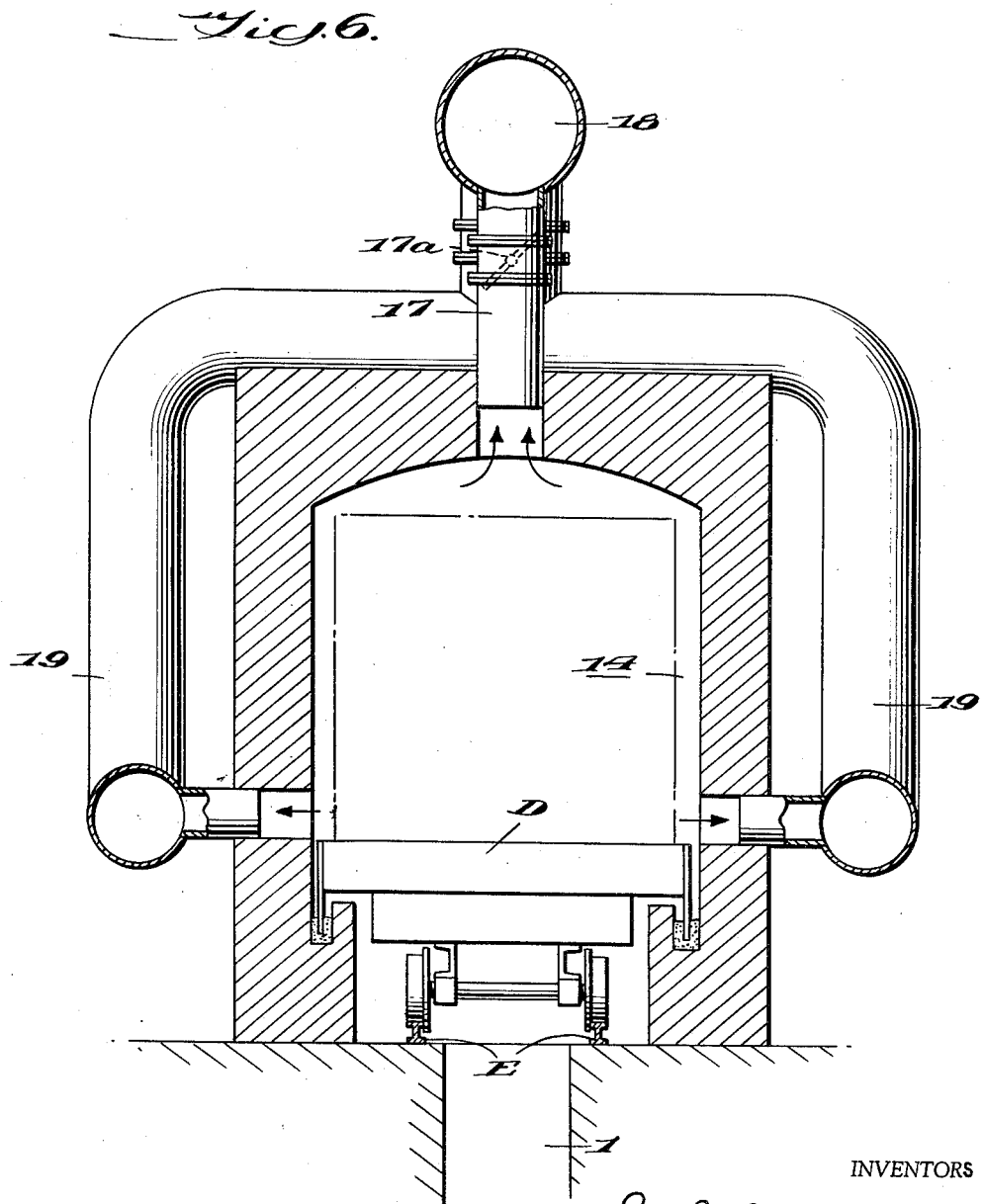

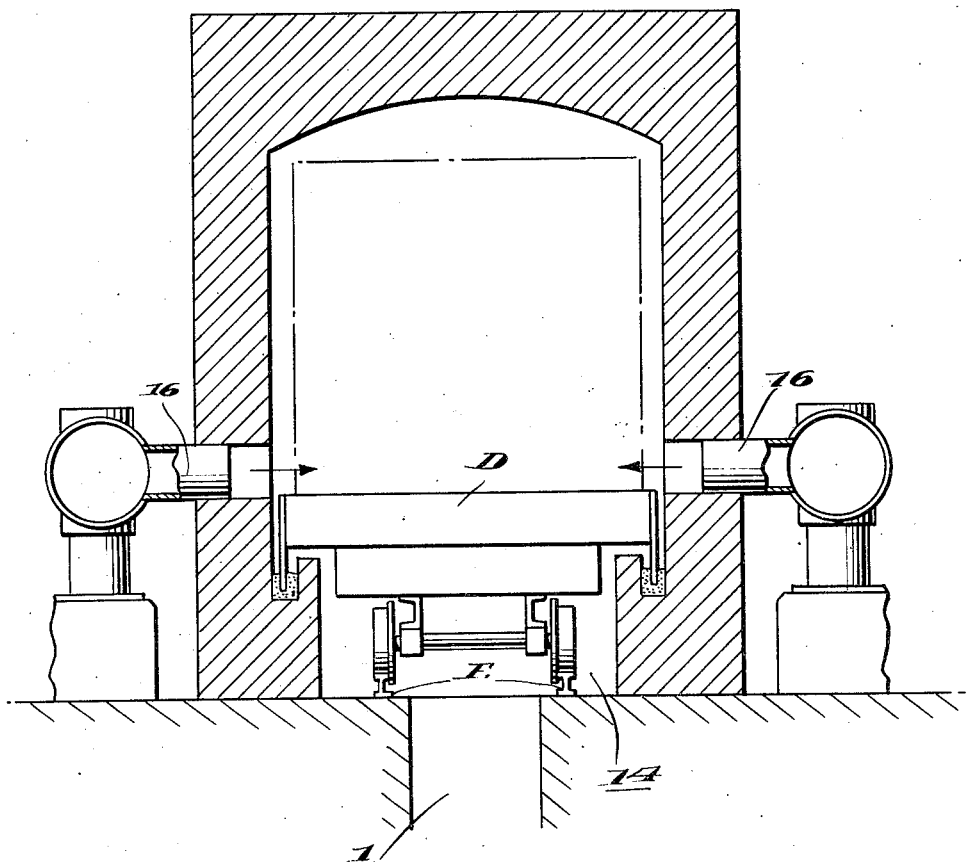

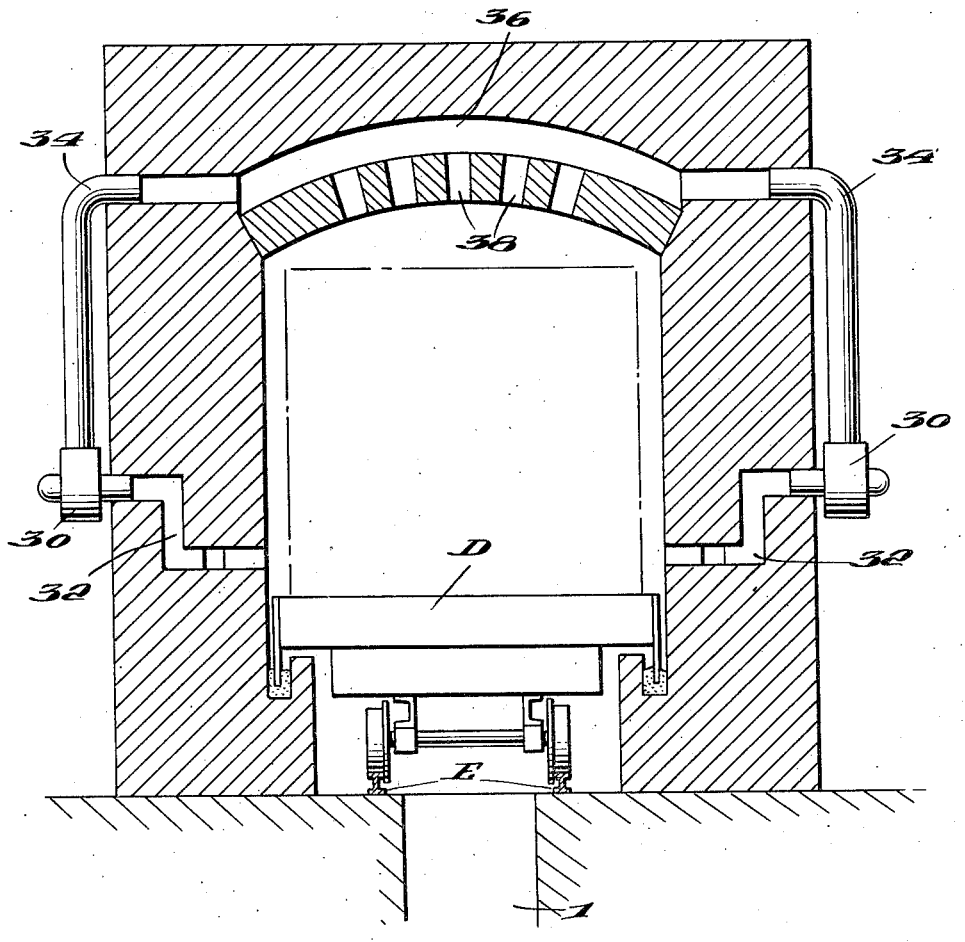

United States Patent Office 3,038,711
Patented June 12, 1962

3,038,711
CONTINUOUS KILNS
Per Eg Gummeson and Mihkel Mathiesen, Hoganas, Sweden, assignors to Aktiebolaget Hoganasmetoder, Hoganas, Sweden, a Swedish company
Filed Dec. 12, 1958, Ser. No. 780,168
Claims priority, application Sweden Dec. 13, 1957
3 Claims. (Cl. 263—28)

The present invention relates to continuous kilns and more specifically to tunnel kilns of the type used for the production of sponge iron.

A continuous kiln of this type comprises preheating, burning or reduction and cooling sections or zones in end to end relation to form a continuous tunnel through which the material to be heated is passed.

One of the more important problems in the design of such furnaces for the production of sponge iron by reducing ore below the melting point in saggers or tubes, is the cooling section, i.e. since direct cooling with air easily causes reoxidation of the reduced iron due to its large and highly active surface in the spongy state. Therefore the cooling hitherto has been substantially carried out as an indirect cooling in different types of recuperator constructions. Simultaneously, however, direct cooling to a lower extent has taken place by means of secondary air for the combustion in the burning or reduction section, which secondary air has been introduced through ports or openings at the exit end of the furnace and permitted to pass countercurrently to the material through the cooling sections of the furnace. The risk of reoxidation has limited the amount of such cooling considerably and in the same limiting direction also acts the fact that there is a maximum value for the amount of secondary air which economically can be admitted to the heating or reduction zone. These conditions have brought about that the cooling sections of the furnaces in question must be built to a considerable extent or length, thereby increasing the costs of the furnaces.

The main object of the present invention now is to make possible a more effective cooling in shorter cooling section and thereby considerably to decrease the building cost of the furnaces.

In order to obtain this object and other advantages which will be evident from the following description, it is characteristic for a furnace according to this invention that the cooling section is divided into two zones in end to end relation, viz. one recuperative zone for indirect cooling and one zone for direct cooling, the zone for direct cooling being provided with air inlets at the discharge end of the furnace and with air outlets at the top and bottom of the opposite end of the direct cooling zone, said outlets being provided with dampers for controlling the amount of air circulating through said direct cooling zone and the part thereof to be passed through the indirect cooling zone as secondary air to the combustion or reduction zone according to the temperature desired and for controlling and equalisation of the pressure over the cross section of the cooling zone, said indirect cooling zone being limited in length to perform a cooling of the material only down to a temperature which is not detrimental for the material in contact with the cooling air in the direct cooling zone.

Also in the recuperator or indirect cooling zone it is desirable to equalize the pressure and temperature differences between top and bottom of the furnace tunnel, thereby making the heat front more vertical and for this purpose fans are advantageously installed in the recuperator for circulating its atmosphere between top and bottom in a sense transverse to the longitudinal direction of the furnace.

The recuperator is suitably assembled from tubes of heat and oxidation resistant steel, the tube sections passing vertically along the sides and under the top wall of the furnace chamber being telescopically inserted in fittings so as to be easily exchangeable from the channel below the furnace during operation. When very high temperatures are used in the combustion section and for security in case of interruption of the electric current which may cause stand still of the kiln cars of high temperature, which in turn would cause superheating of the recuperator tubes, a section of the recuperator closest to the combustion section can advantageously be built of ceramic fire-proof material, but this section should be made as short as possible in order to make possible a short furnace construction, the heat transfer in a metallic recuperator being much more effective than in a ceramic recuperator.

The invention is now to be described more in detail with reference to the accompanying drawings illustrating by way of example but not in a limiting sense one embodiment of the invention.

In the drawings:

FIG. 1 is a horizontal and FIG. 2 a vertical longitudinal section through a continuous kiln with cooling sections according to the invention.

FIGS. 3 and 4 show on a larger scale a vertical and a horizontal longitudinal section respectively through the cooling section.

FIGS. 5, 6 and 7 finally are sections on the line V, VI and VII respectively of FIGS. 3 and 4.

On the drawings A designates the preheating section B the combustion or reduction section and C the cooling section, whereas D designates tunnel kiln cars pushed through the kiln on rail E. Close to the entrance end of the preheating section there are provided channels F for the exhaust gases and the combustion or reduction section is provided with burners G.

The cooling section of the kiln according to the invention consists of one indirect and one direct cooling zone. The indirect cooling zone in the illustrated embodiment is divided into one ceramic recuperator 10 and one metallic recuperator 12. The direct cooling zone on the drawings has the reference numeral 14.

The cooling air for the direct cooling is blown into the direct cooling zone 14 through ports or openings 16 by means of fans 15. The main part of the cooling air is taken out through conduit 18 connected with the top of the direct cooling section by conduit 17 and to the bottom region of the same by means of conduit 19. In these conduits 17 and 19 there are provided dampers 17a and 19a respectively for control of the pressure and temperature difference and for equalizing the same over the cross section of the cooling section. Also in the collecting conduit 18 there is suitably provided a damper 18a for control of the proportions of the direct cooling air to be taken out as heated air and permitted to continue through the kiln as secondary combustion air respectively.

In the metallic recuperator 12 cooling air is admitted through bottom channels 20 to the metallic recuperator tubes 24 and taken out through collecting conduit 22 outside of the kiln. This conduit 22 in the illustrated embodiment is directly connected with the channel for heated air exhausted from the ceramic recuperator part (see FIG. 2).

As is seen from FIG. 2 heated air from the recuperator section is conducted to the burners G through channels 23.

The air intake for direct cooling is more clearly illustrated in FIG. 7, and the air outtake from the same in FIG. 6.

A suitable construction of the metallic recuperator is more fully illustrated in FIG. 5. The metallic recuperator as illustrated consists of a series of pipes 24, telescopically inserted in sockets 26 of the collecting channel 22 with their opposite ends resting on lids 28 at the end of the inlet channels 20 for the cooling air. This construction or design makes possible a simple exchange of damaged or spent pipes in the following way.

The kiln cars are moved apart at the place where the exchange is to take place so that the tubes become available from the inspection channel below the kiln. The tube to be exchanged is lifted free of the lid 28, its upper end moving further into the socket 26. The tube is then turned so that it can be lowered down into the inspection channel and a new tube is inserted in a corresponding manner.

In order to equalize the temperature and pressure of the kiln atmosphere also in the recuperator or indirect cooling section of the kiln there may be provided special means for circulating this atmosphere between the bottom and top sections of the kiln. This means is separately illustrated in a sectional view in FIG. 8, where 30 designates a fan sucking the atmosphere from the bottom of the kiln through channels 32 and blowing the same through pipes 34 and chambers or channels 36 and holes 38 in the roof of the kiln into its top section. The pipes, channels and fan in this case of course are made from high temperature resistant material.

We claim:

1. A continuous kiln formed of vertical side walls and a roof, said kiln comprising a preheating section, a combustion section and a cooling section arranged in open end to end relation to form a tunnel through which cars carrying the material to be treated may be passed, said cooling section comprising a recuperator zone adjacent to and in open end to end relation with said combustion section designed for indirect cooling and a direct cooling zone which is adjacent to and in open end to end relation with said recuperator zone, means for introducing cooling air into said direct cooling zone adjacent the end thereof which is remote from said recuperator zone and means for withdrawing part of the cooling air from said direct cooling zone adjacent the end thereof which is adjacent to said recuperator zone but permitting the rest of said cooling air to pass from said direct cooling zone through said recuperator zone to said combustion section, and means for passing additional cooling air in heat-conducting contact with said recuperator zone but out of contact with the interior thereof.

2. A continuous kiln as defined in claim 1 in which said means for introducing cooling air into said direct cooling zone comprises inlet openings adjacent the end of said direct cooling zone which is remote from said recuperator zone, a fan connected to deliver cooling air into said inlet openings, said means for withdrawing cooling air from said direct cooling zone comprises exhaust conduits connected adjacent to the top and bottom of said direct cooling zone, dampers in said exhaust conduits for controlling the flow of air therethrough whereby the temperature and pressure in the top and bottom regions of said direct cooling zone may be controlled, a collecting conduit connected to said exhaust conduits, and a damper in said collecting conduit.

3. A continuous kiln formed of vertical side walls and a roof, said kiln comprising a preheating section, a combustion section and a cooling section arranged end to end to form a tunnel through which cars carrying the material to be treated may be passed, said cooling section being divided into a recuperator zone adjacent to said combustion section designed for indirect cooling and a direct cooling zone which is separated from said combustion section by said recuperator zone, means for introducing cooling air into said direct cooling zone adjacent the end thereof which is remote from said recuperator zone and means for withdrawing cooling air from said direct cooling zone adjacent the end thereof which is adjacent to said recuperator zone whereby only a minor part of said cooling air may be permitted to pass from said direct cooling zone through said recuperator zone to said combustion section, and means for passing additional cooling air in heat-conducting contact with said recuperator zone but out of contact with the interior thereof, said recuperator zone comprising a ceramic portion adjacent to said combustion section and a portion which is lined with metal tubes adjacent to said direct cooling zone, said last named portion comprising air inlet openings extending through the side walls thereof adjacent to the bottom thereof, lids supported along the inner surface of each of said side walls adjacent said air inlets, orifices in said lids, metal pipes having their lower ends resting in said lids and communicating with said orifices and extending along said side walls and inwardly along said roof to adjacent the center line thereof and upwardly through said roof, a conduit extending longitudinally of said tunnel above said roof, openings in the lower surface of said conduit and a tubular socket extending downwardly from each of the last named openings, the upper ends of said metal pipes fitting loosely in said sockets.

References Cited in the file of this patent

UNITED STATES PATENTS

| | | |
|---|---|---|
| 1,223,732 | Reams | Apr. 24, 1917 |
| 1,288,975 | Owens | Dec. 24, 1918 |
| 1,338,771 | Harrop | May 4, 1920 |
| 1,796,264 | Grondal et al. | Mar. 10, 1931 |
| 1,808,152 | Bailey | June 2, 1931 |
| 1,881,388 | Morton | Oct. 4, 1932 |
| 2,489,820 | Russell et al. | Nov. 29, 1949 |
| 2,736,943 | Cremer | Mar. 6, 1956 |

FOREIGN PATENTS

| | | |
|---|---|---|
| 895,273 | Germany | Nov. 2, 1953 |